(12) United States Patent
Dodson

(10) Patent No.: US 6,554,667 B1
(45) Date of Patent: Apr. 29, 2003

(54) DEVICE FOR ACHIEVING HAND CONTROL OF A CONTROL PEDAL FOR AN ELECTRIC TROLLING MOTOR

(76) Inventor: Paul D. Dodson, 1450 Country Ridge Rd., Bassett, VA (US) 24055

( * ) Notice: Subject to any disclaimer, the term of this patent is extended or adjusted under 35 U.S.C. 154(b) by 0 days.

(21) Appl. No.: 10/043,730

(22) Filed: Jan. 14, 2002

(51) Int. Cl.[7] ................................................ B60L 15/20
(52) U.S. Cl. ............................................ 441/7; 114/153
(58) Field of Search ........................... 440/6, 7, 84, 85, 440/86; 114/144 R, 153

(56) References Cited

U.S. PATENT DOCUMENTS

| | | |
|---|---|---|
| 4,604,066 A | 8/1986 | Davatz |
| 5,012,888 A * | 5/1991 | MacInnis .................... 180/336 |
| 5,507,242 A | 4/1996 | LeBlanc et al. |
| 5,551,899 A | 9/1996 | Hatcher |
| 5,832,440 A | 11/1998 | Woodbridge et al. |
| 6,238,320 B1 * | 5/2001 | Flanagan ..................... 482/41 |

* cited by examiner

Primary Examiner—Stephen Avila
(74) Attorney, Agent, or Firm—Norman B. Rainer

(57) ABSTRACT

A removably attachable device for achieving hand control of a foot control pedal for an electric trolling motor includes a mounting plate attachable to a side surface of the pedal, and a securing tube attached to the mounting plate. A telescopically adjustable tubular stanchion is held upright by the securing tube, and contains a hand grip at its uppermost extremity. An on/off electrical switch is located adjacent the hand grip. Electrical conductor wires extend from the on/off switch and through the stanchion, and join with an on/off electrical switch component of the control pedal.

5 Claims, 3 Drawing Sheets

DEVICE FOR ACHIEVING HAND CONTROL OF A CONTROL PEDAL FOR AN ELECTRIC TROLLING MOTOR

BACKGROUND OF THE INVENTION

1. Field of the Invention

The present invention relates to a device for installation onto a foot operated controller of an electric trolling motor to permit either hand or foot operation of the controller.

2. Description of the Prior Art

The use of a foot pedal for controlling the steering of an electric trolling motor is well known in the prior art. In general, the operation of such pedals is such that depression in a forward direction produces steering to the right, and reverse movement of the pedal produces steering to the left. The pedal apparatus is also equipped with an on/off switch and a speed control function.

For various reasons, it has been found desirable to be able to control both the steering of a trolling motor and its on/off status by hand manipulation. Devices which are attachable to a pedal controller for achieving hand control of a trolling motor are described in U.S. Pat. No. 4,604,066 to Davatz and U.S. Pat. No. 5,551,899 to Hatcher.

The Davatz device employs a base shoe 20 which fits atop the pedal apparatus. Said base shoe must have a contour that fits the curved or flat surface of the pedal, and must further have cut-away regions that accommodate the speed control and on/off features of the pedal. An elongated rod 34 extending upwardly from a side edge of the base shoe permits hand operated manipulation of the pedal. A rod 40, pivotally held by the elongated rod, is moveable by hand in up and down directions to interact with the on/off switch of the pedal apparatus. Although probably effective in operation, the Davatz device must be custom-fitted to each specific type or brand of pedal apparatus.

The Hatcher device involves bolted attachment to the center of the pedal. Such manner of installation precludes the possibility of foot control of the pedal, thereby eliminating the versatility that would be afforded by a control system that can be operated by either hand or foot.

It is accordingly an object of the present invention to provide a device for attachment to the control pedal for an electric trolling motor to facilitate both hand and foot manipulation of said pedal.

It is another object of this invention to provide a device as in the foregoing object which does not require customization in order to accommodate to said control pedal.

It is a further object of the present invention to provide a device of the aforesaid nature which is of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a device for attachment to a control pedal for an electric trolling motor, said pedal being pivotally supported by a stationary pedestal member and having upper and side surfaces and further equipped with an on/off control, said device comprising:

a) a mounting plate adapted to attach to the side surface of said pedal, b) a straight stanchion comprised of telescopically interactive upper and lower tubular portions, each elongated between top and bottom extremities, c) hand grip means associated with the top extremity of said upper tubular portion, d) on/off electrical switch means positioned closely adjacent said hand grip means, e) securing means for achieving joinder of the bottom extremity of said lower tubular portion with said mounting plate, and f) electrical conductor wires connected to said on/off electrical switch means and extending through said stanchion to electrical joinder with the on/off control of said pedal.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
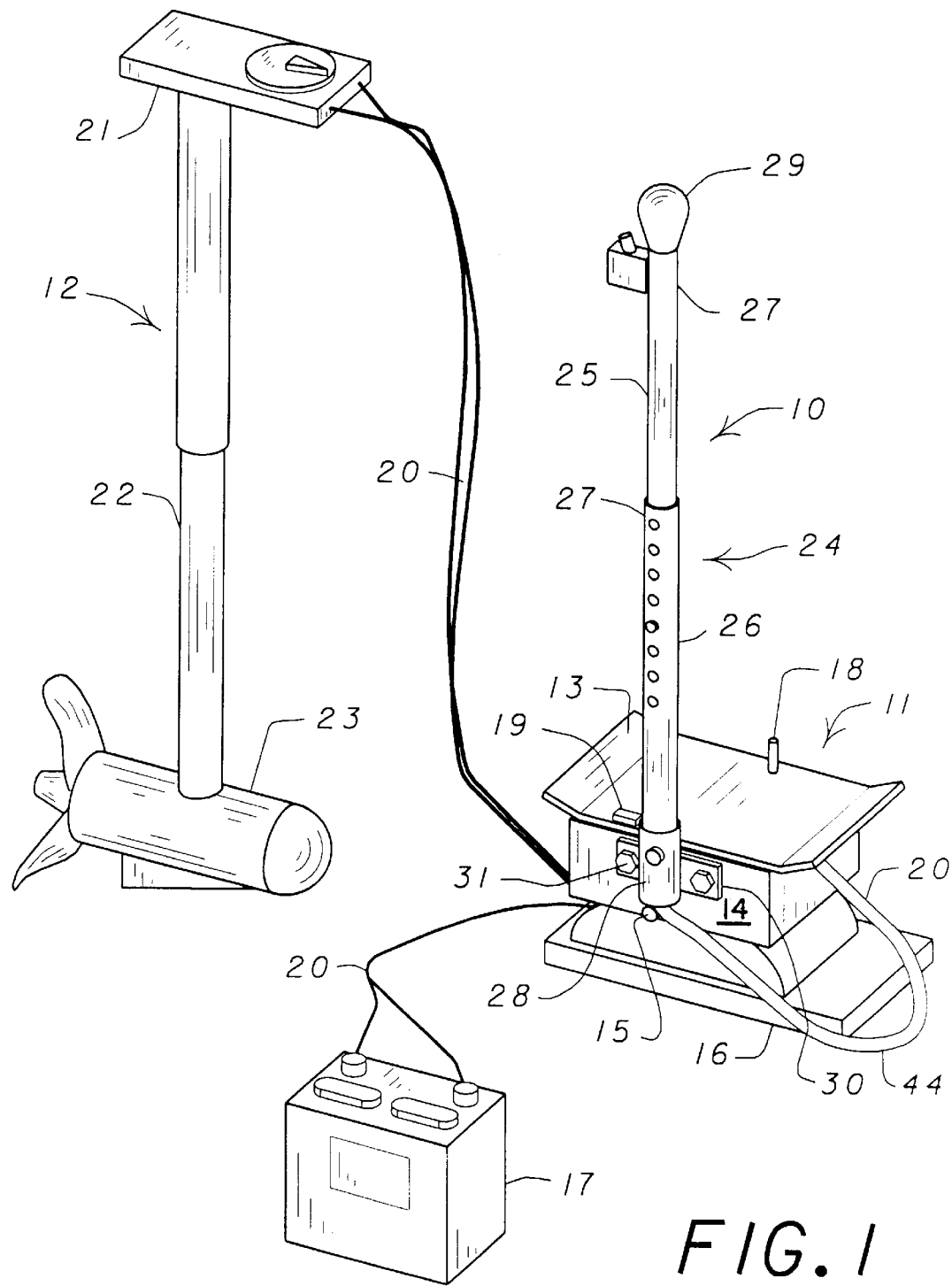
FIG. 1 is a perspective side view of an embodiment of the device of the present invention shown in association with an electric trolling motor and a control pedal apparatus for said motor.

Referring now to FIG. 1, an embodiment of the hand control attachment device 10 of the present invention is shown in operative association with a foot control pedal apparatus 11 and a trolling motor 12 activated by storage battery 17.

Pedal apparatus 11 is of a generally standard construction, comprised of platform 13 having a side wall panel 14 pivotally mounted at 15 to stationary pedestal member 16. Associated with said platform is an electrical on/off switch 18 and electrical speed control means 19. Suitable electrical wiring 20 is interactive between switch 18, speed control means 19, battery 17 and motor 12.

Trolling motor 12 is typically comprised of head member 21, vertical shaft 22 and propeller unit 23. Mounting means (not shown) are usually associated with shaft 22 to permit adjustable and releasable attachment to a boat.

The attachment device 10 of this invention is comprised of stanchion 24 comprised of telescopically interactive upper and lower tubular portions 25 and 26, respectively, each elongated between top and bottom extremities 27 and 28, respectively. Hand grip means in the form of knob 29 is positioned upon the top extremity of upper tubular portion 25.

Figure 2:
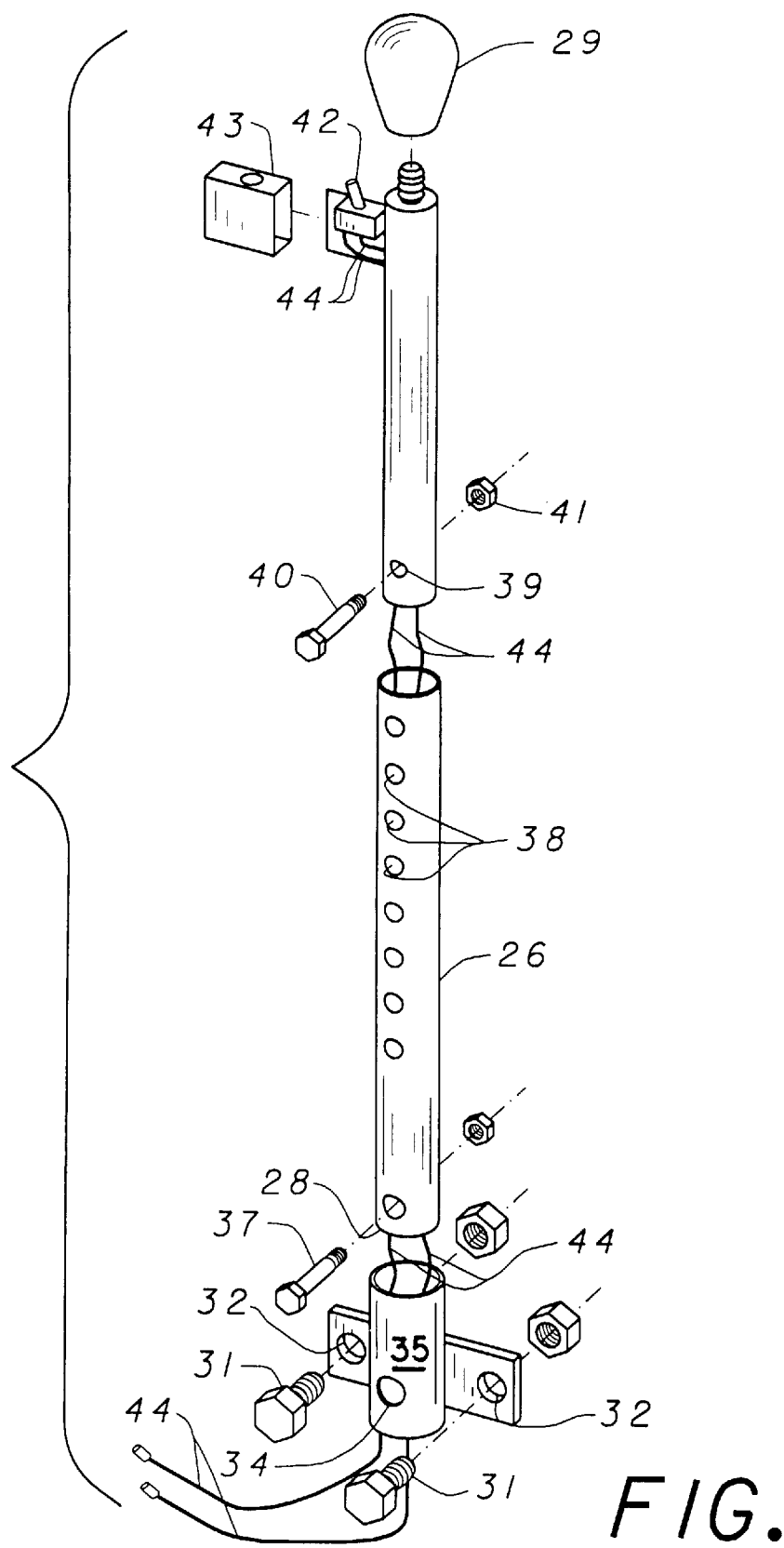
FIG. 2 is an enlarged exploded perspective view of the embodiment of FIG. 1.

A mounting plate 30 is adapted to attach to sidewall panel 14. The exemplified embodiment of plate 30, as further shown in FIG. 2, attaches to said sidewall panel by way of bolts 31 that pass through apertures 32 in plate 30 and engage aligned holes in sidewall panel 14. In other embodiments, brackets may be attached to said sidewall panel for slideably receiving plate 30 by downward vertical insertion.

Securing means, in the form of receiving tube 35 is attached to plate 30. The bottom extremity 28 of lower tubular portion 26 is adapted to fit within receiving tube 35, and may be secured therein either by way of friction fit or by way of securing bolt 37 which insertively engages aligned holes 34 in receiving tube 35 and corresponding holes in tubular portion 26.

The effective length of stanchion 24 may be adjusted by sliding interaction of said upper and lower tubular portions. A series of diametrically paired holes 38 in spaced apart vertical alignment in said lower portion are adapted to align with an opposed pair of locking apertures 39 in upper portion 25. A threaded securing bolt 40 and associated lock nut 41 secures the sought overall length of the stanchion.

An electrical on/off switch 42 is positioned closely adjacent hand grip knob 29, and may be enclosed within protective housing 43. Electrical conductor wires 44 are connected to switch 42 and extend downwardly through said stanchion, emerging through the open bottom extremity 28 of lower tubular portion 26 and thence through the open bottom extremity of receiving tube 35.

Figure 3:
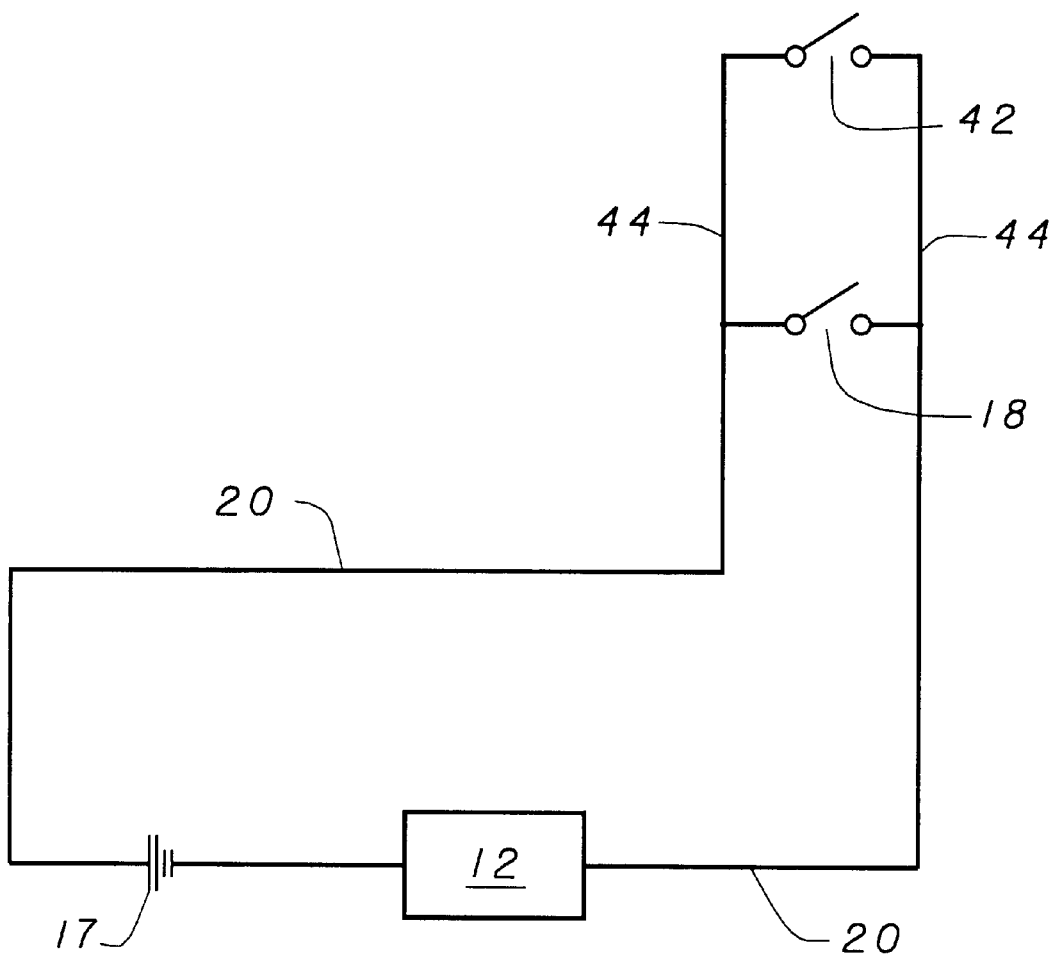
FIG. 3. is a schematic wiring diagram for the device in interactive association with said control pedal apparatus.

As shown in FIG. 3, conductor wires 44 connect in parallel with on/off switch 18 of platform 13. By virtue of such wiring arrangement, on/off switch 42 associated with hand grip knob 29 will control the on/off operation of the trolling motor when the on/off switch 18 associated with pedal apparatus 11 is in its off position.

By virtue of the aforesaid specialized components of the device of this invention and their interaction, the device can be easily installed either as an add-on feature of an already existent pedal apparatus, or can be factory-installed as an added feature of versatility to the pedal apparatus. The device of this invention enables the user to employ either hand or foot manipulation to tilt platform 13 with respect to pedestal member 16, thereby controlling the operation of the associated trolling motor.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for attachment to a control pedal for an electric trolling motor, said pedal being pivotally supported by a stationary pedestal member and having upper and side surfaces and further equipped with an on/off control, said device comprising:

a) a mounting plate adapted to attach to the side surface of said pedal, b) a straight stanchion comprised of telescopically interactive upper and lower tubular portions, each elongated between top and bottom extremities, c) hand grip means associated with the top extremity of said upper tubular portion, d) on/off electrical switch means positioned closely adjacent said hand grip means, e) a receiving tube attached to said mounting plate and configured to slideably receive the bottom extremity of said lower tubular portion, and f) electrical conductor wires connected to said on/off electrical switch means and extending through said stanchion to electrical joinder with the on/off control of said pedal.

2. The device of claim 1 wherein said hand grip means is a knob.

3. The device of claim 1 wherein said upper and lower tubular portions each have a series of diametrically paired holes in spaced apart vertical alignment.

4. The device of claim 3 wherein the effective length of said stanchion is adjustable by way of sliding interaction of said upper and lower tubular portions and interengagement of said tubular portions by way of a securing bolt that penetrates said aligned paired holes.

5. The device of claim 4 wherein said conductor wires connect in parallel with said on/off control of said pedal.

* * * * *